United States Patent [19]

Mitsuhashi et al.

[11] Patent Number: 5,130,878
[45] Date of Patent: Jul. 14, 1992

[54] THIN FILM MAGNETIC HEAD COMPRISING A PROTECTIVE LAYER

[75] Inventors: Daisuke Mitsuhashi; Noboru Kawasaki, both of Tokyo; Osamu Shimizu, Kanagawa; Satoshi Yoshida, Kanagawa; Takashi Kubo, Kanagawa, all of Japan

[73] Assignee: Fuji Photo Film Co., Ltd., Kanagawa, Japan

[21] Appl. No.: 496,717

[22] Filed: Mar. 7, 1990

Related U.S. Application Data

[62] Division of Ser. No. 305,678, Feb. 2, 1989, abandoned.

[30] Foreign Application Priority Data

Feb. 8, 1988 [JP] Japan .................................. 63-25722
Nov. 1, 1988 [JP] Japan .................................. 63-274402

[51] Int. Cl.$^5$ .............................................. G11B 5/147
[52] U.S. Cl. ................................................... 360/126
[58] Field of Search .......................... 360/125–127, 360/122, 110; 428/900, 450, 471, 472

[56] References Cited

U.S. PATENT DOCUMENTS

| | | | |
|---|---|---|---|
| 4,681,813 | 7/1987 | Yamada et al. | 360/126 |
| 4,948,667 | 8/1990 | Mikami et al. | 360/126 |
| 4,975,398 | 12/1990 | Brar et al. | 360/127 |

FOREIGN PATENT DOCUMENTS

| | | | |
|---|---|---|---|
| 0156916 | 12/1981 | Japan | 360/126 |
| 0052422 | 3/1984 | Japan | 360/126 |

*Primary Examiner*—David J. Severin
*Attorney, Agent, or Firm*—Sughrue, Mion, Zinn, Macpeak & Seas

[57] ABSTRACT

A regulating plate disposed opposite to a magnetic head with respect to a rotary flexible magnetic disk and in sliding contact with the flexible magnetic disk, having protruding portions provided on the regulating plate at upstream and downstream sides of the magnetic head, top portions of the protruding portions being formed to flat surfaces, thereby obtaining stable sliding contact of the magnetic head with the flexible magnetic disk from the beginning, and a thin film magnetic head comprised at least of a magnetic layer, a coil conductor layer, and an insulative layer formed on a substrate, and a protective layer stacked on the magnetic layer, characterized in that the protective layer comprises MgO, $SiO_2$, and $Al_2O_3$.

1 Claim, 7 Drawing Sheets

5,130,878

THIN FILM MAGNETIC HEAD COMPRISING A PROTECTIVE LAYER

This is a divisional of application Ser. No. 07/305,678 filed Feb. 2, 1989, now abandoned.

BACKGROUND OF THE INVENTION

This invention relates to a regulating plate designed for improved contact with a flexible magnetic disk, and to a thin film magnetic head, more specifically to a thin film magnetic head having an improved protective layer stacked on a magnetic layer.

Recently, there has been developed an electronic camera system, which is now drawing attention, using an image pickup device such as a solid-state imaging device or an image pickup tube combined with a recording device using a flexible magnetic disk as a low-cost recording medium having a relatively large storage capacity to take the image of a subject as a pure eleccc-tronic still picture, which is recorded on a rotating flexible magnetic disk, and the image is reproduced by a separate television or printer.

The flexible magnetic disk for such a system is used in the form of a flexible magnetic disk pack. Specifically, as shown in FIG. 5, a flexible magnetic disk 3, on which still picture information or the like is magnetically recorded, is rotatably contained in a flexible magnetic disk pack 2 which is installed in a fixed flexible magnetic disk unit 1. The flexible magnetic disk 3 is a magnetic recording medium with a diameter of about 50 mm, on which concentric tracks are formed from the inner periphery to the outer periphery. To rotate the flexible magnetic disk 3 at a high speed, a center core attached to the center of the flexible magnetic disk 3 is engaged with a spindle 6 of a motor 5. Further, there is provided a magnetic head 7 for magnetic recording on the flexible magnetic disk 7, which is movable in the radial direction. To achieve reliable recording on the flexible magnetic disk 3 which is rotating at a high speed, the magnetic head 7 must be in stable sliding contact with the flexible magnetic disk 3. However, since the flexible magnetic disk 3 has a flexibility, a stable contact is not achieved by simply pressing the magnetic head 7 against the flexible magnetic disk 3. Therefore, a regulating plate 8 is provided at the opposite side of the magnetic head 7 with respect to the flexible magnetic disk 3, to provide a stable contact of the flexible magnetic disk 3 with the magnetic head 7 by the function of an air flow between the regulating plate 8 and the flexible magnetic disk 3.

As a regulating plate for this purpose, for example, there has been developed one which is shown in FIG. 6. A regulating plate 9 is provided with protruding portions 10a and 10b at the upstream side and the downstream side with respect to the magnetic head 7, and with a hollowed portion 10c along the scanning direction of the magnetic head 7. Each of the protruding portions 10a and 10b has an inclined surface which becomes higher toward the downstream side in the rotational direction of the flexible magnetic disk 3 and becomes closer to the flexible magnetic disk 3. With this configuration, when the flexible magnetic disk 3 rotates, a positive pressure is generated between the protruding portions 10a and 10b and the flexible magnetic disk 3, and the flexible magnetic disk 3 is urged towards the magnetic head 7. In addition, at the outer peripheral side of the regulating plate 9 is provided a protruding portion 11 perpendicular to the radial direction. The protruding portion 11 is to hold the outer periphery of the flexible magnetic disk 3 which is subject to a large deflection, thereby achieving a uniform head touch over the whole tracks.

However, with such a positive pressure generated between the incline surfaces of the regulating plate 9 and the flexible magnetic disk 3, the regulating plate 9 is not always non-contacting with the flexible magnetic disk 3. It can rather be considered that the protruding portions 10a and 10b of the regulating plate 9 are pressing the flexible magnetic disk 3. Since, in particular, a positive pressure is not generated between the inclined surfaces of the regulating plate and the flexible magnetic disk at the start and stop of the spindle motor, the protruding portions 10a and 10b of the regulating plate 9 may become in contact with the flexible magnetic disk. Therefore, at the start and stop of rotation of the flexible magnetic disk, the flexible magnetic disk comes into contact with the regulating plate and may be scratched. In our actual experiments, an abrasion was observed on the protruding portions 10a and 10b of the regulating plate. In general, if the shape of the regulating plate changes due to abrasion, it will become difficult to maintain stable contact between the magnetic head 7 and the flexible magnetic disk 3, which will result in decreased output in recording and reproduction and deteriorated characteristics. We made investigation into changes in self-recording/reproduction output versus the number of start/stop cycles of the spindle motor, and obtained the result as shown in FIG. 4. In the figure, ENV (MIN/MAX) represents the ratio of valley to peak of the envelope curve of reproduced waveform, the greater is the value of the ratio, the better is the condition of contact between the magnetic head 7 and the flexible magnetic disk 3. Contrary to our expectation, it is shown that, although to a slight extent, contact condition between the magnetic head 7 and the flexible magnetic disk 3 improves with increasing number of start/stop cycles. This means that abrasion of the protruding portions 10 and 11 of the regulating plate 9 does not always have adverse effects but, to the contrary, provides an improved contact and hence improved results.

If it is the case, when the regulating plate 9 is previously formed to an abraded shape, a good contact between the magnetic head 7 and the flexible magnetic disk 3 should be obtained from the first. With an eye on the above fact, the present invention has thus been accomplished.

In the meantime, a thin film magnetic head comprises a substrate made of an abrasion-resistant material such as ferrite or sapphire, having on it a plurality of magnetic layers formed from sendust or an amorphous material, a coil conductor comprising an electroconductive metal, and an insulative layer, which are successively formed and etched into a predetermined pattern, and finally a protective layer formed to protect the magnetic layers from abrasion by a recording medium running on it.

It has been known for long, if the protective layer is sufficiently hard compared with the magnetic layer in the above-described configuration, abrasion due to running of the recording medium reaches the magnetic layer faster, which results in a biased abrasion in the magnetic layer, causing a spacing loss.

On the other hand, if the protective layer is too soft, overall abrasion proceeds faster, resulting in a shortened head life. Therefore, it is preferable that the protective layer is nearly as hard as, or slightly softer than the magnetic layer.

For example, for a magnetic layer with a Vickers hardness of Hv=600 to 650 kg/mm$^2$, the protective layer is preferably set to a hardness of Hv=550 to 700 kg/mm$^2$.

The protective layer, in view of the slidability of the recording medium and resistance to biased abrasion, is necessary to have a thickness of over 20 to 40 μm. However, with such a thickness, the protective layer can generally undergo peeling or cracking due to an accumulated internal stress. Therefore, it is necessary to reduce internal stress to as small as possible. An effective means to solve the problems is to bring thermal expansion coefficients of materials of the head close to one another. However, in the past, it has been difficult to bring the thermal expansion coefficients of a metallic magnetic material and the protective layer close to each other.

Japanese Patent Publication Laid-open No. 62-16218/1987 discloses a mixture of MgO and SiO$_2$ as a protective layer that can effectively suppress occurrence of biased abrasion. It also describes that an adequate hardness (Hv=450 to 850) and the desired thermal expansion coefficient can be obtained by setting the compositional ratio of MgO and SiO$_2$ to 10 to 70% of SiO$_2$.

However, the inventor of the present invention has conducted various experiments and found that the above MgO-SiO$_2$ system has large flexibilities in terms of hardness and stress, but is inferior in water resistance, and has major defects for practical use. Specifically, for a preferable Vickers hardness range (over 550 kg/mm$^2$), the MgO content is over 70 mole %, but such a material is inferior in water resistance, resulting in degradation and rusting at high temperatuare and humidity, which is not suitable for practical use. On the other hand, when the MgO content is below 70%, the water resistance is improved to a passable level, but the material is too soft, that is, the Vickers hardness is in an inadequate range, which is also not suitable for practical use.

Thus, it is a first object of the present invention to provide a regulating plate which has previously been formed to an abraded shape so that a good contact with the flexible magnetic disk is obtained from the initial stage. A second object of the present invention is to provide a thin film magnetic head with a protective layer which does not undergo biased abrasion and is superior in water resistance.

SUMMARY OF THE INVENTION

In accordance with the present invention which attains the above objects, there is provided a regulating plate for a rotary flexible magnetic disk device disposed opposite to a magnetic head with respect to a rotating flexible magnetic disk and in sliding contact with the flexible magnetic disk, comprising protruding portions at upstream and downstream sides of the magnetic head, and having flat surfaces at the top of the protruding portions.

With the regulating plate according to the present invention, in which the top portions of the protruding portions, which are subject to abrasion by sliding contact with the flexible magnetic disk, are previously formed to flat surfaces, a stable contact between the magnetic head and the flexible magnetic disk is obtained from the initial stage. Furthermore, since the protruding portions are formed to a shape of saturated amount of abrasion, the regulating plate of this shape will no longer be subject to a substantial abrasion.

There is also provided according to the present invention a thin film magnetic head comprising a magnetic layer, a coil conductor layer, and an insulative layer formed on a substrate, and a protective layer stacked on the magnetic layer, characterized in that the protective payer comprises MgO, SiO$_2$, and Al$_2$O$_3$.

By the addition of an appropriate ratio of Al$_2$O$_3$ to a composition of MgO and SiO$_2$, a protective layer with high water resistance in addition to an adequate hardness is obtained.

BRIEF DESCRIPTION OF DRAWINGS

FIG. 1 (c) is a schematic view showing arrangement of a regulating plate and a magnetic head.

DESCRIPTION OF PREFERRED EMBODIMENTS

Figure 1:
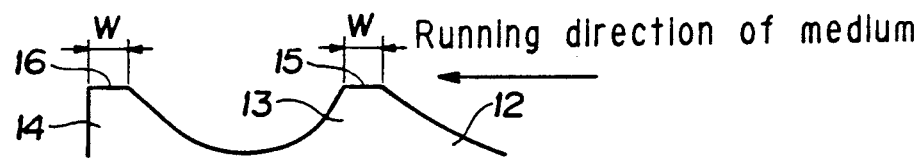
FIGS. 1 (a) and 1 (b) are schematic views showing embodiments of the present invention.
Figure 1:
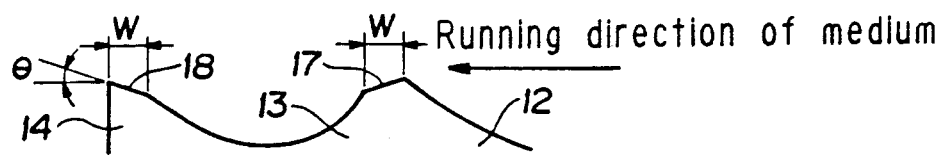
Figure 1:
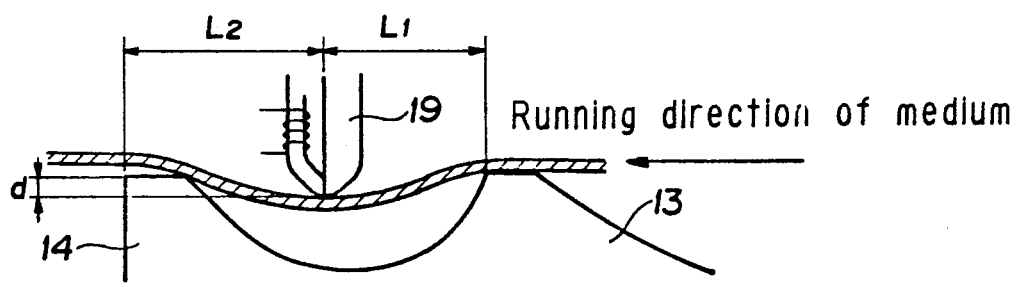
Figure 2:
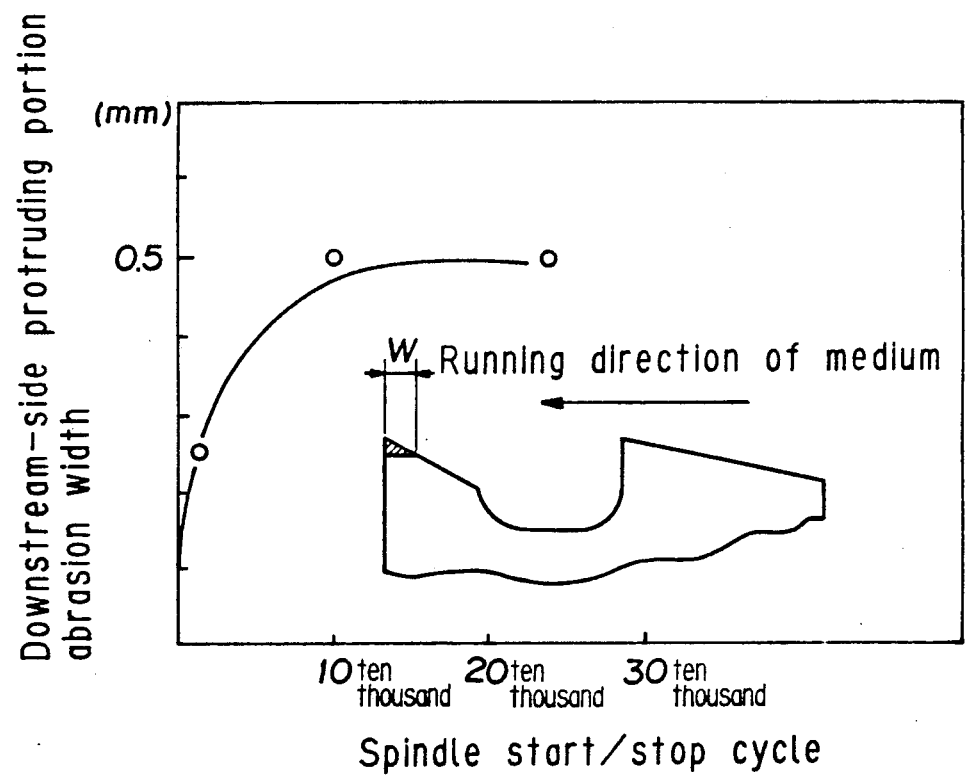
FIG. 2 is a graph showing abrasion width of a downstream-side protruding portion of the regulating plate versus the number of start/stop cycles.

A preferred embodiment of the regulating plate according to the present invention will now be described in detail with reference to the drawings. Referring to FIG. 1 (a) which is a schematic view showing the embodiment of the present invention, a regulating plate 12 is provided with protruding portions 13 and 14, with top portions formed to flat surfaces 15 and 16. Although shapes of the protruding portions 13 and 14 are not restricted to those which are shown in the previously-described prior art, they are preferably formed so that a positive pressure is generated by an air flow between the regulating plate and the flexible magnetic disk. In the figure, the flat surfaces 15 and 16 at the top of the protruding portions are shown horizontally so that they are parallel to the flexible magnetic disk in standstill, but are not restricted to this. Alternatively, as in another embodiment as shown in FIG. 1 (b), flat surfaces 17 and 18 can be inclined to a certain angle from the horizontal direction in the figure. The inclination angle, θ, may be an angle to provide a close contact with the rotating flexible magnetic disk. For example, as shown in FIG. 1 (c), when horizontal distances L$_1$ and L$_2$ between a magnetic head 19 and the protruding portions 13 and 14 are 2 to 3 mm and 5 to 3 mm, respectively, and a projection amount, d, of the magnetic head 19 is in the range from 0 to 50 μm, the inclination angle θ of the flat surfaces 17 and 18 can be 1.5° to 0.5°, preferably 0.8° to 0.7°. The width of the flat surfaces 15 to 18 can be determined from an actual amount of abrasion. Then, abrasion tests were made using a prior art wedge-formed protruding portion, and results as shown in FIG. 2 were obtained. As shown in FIG. 2, the abrasion width, W, rapidly increases up to approximately 100,000 start/stop cycles of the spindle motor, and then levels off, not exceeding approximately 0.5 mm. Therefore, the upper limit of the with W of the flat surfaces can be set to 0.5 mm. The surface of the regulating plate used in the tests was treated with TUFRAM (trade name).

Figure 3A:
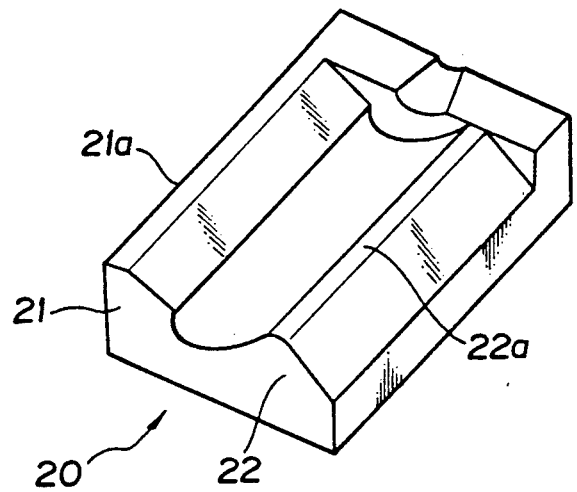
FIGS. 3 (a), 3 (b) and 3 (c) are schematic oblique views of regulating plates to which the present invention is applied.
Figure 3B:
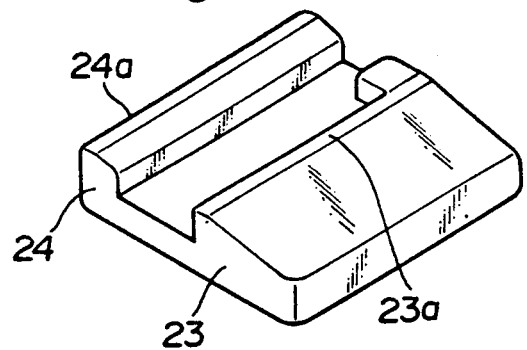
Figure 3C:
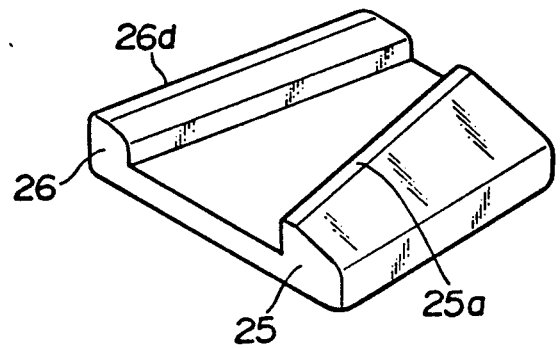
Figure 4:
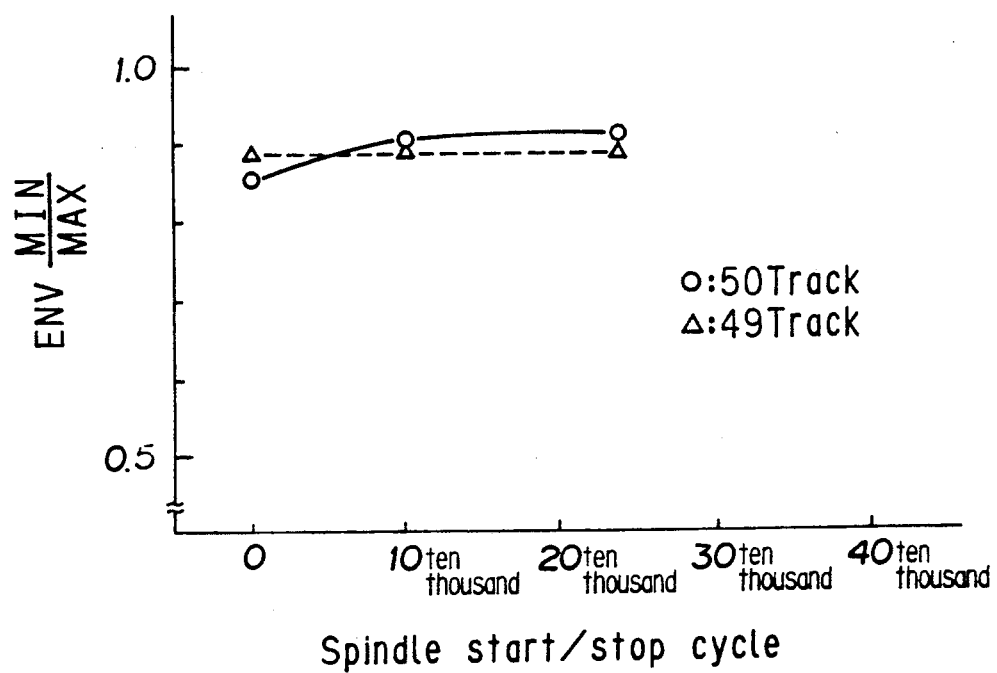
FIG. 4 is a graph showing ENV(MIN/MAX) versus the number of start/stop cycles.
Figure 5:
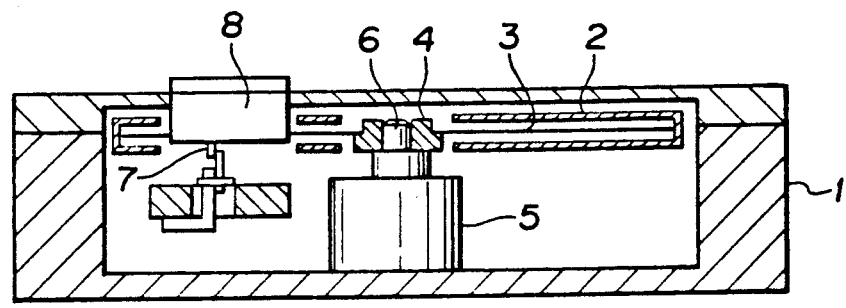
FIG. 5 is a schematic sectional view showing a prior art rotary flexible magnetic disk device.
Figure 6:
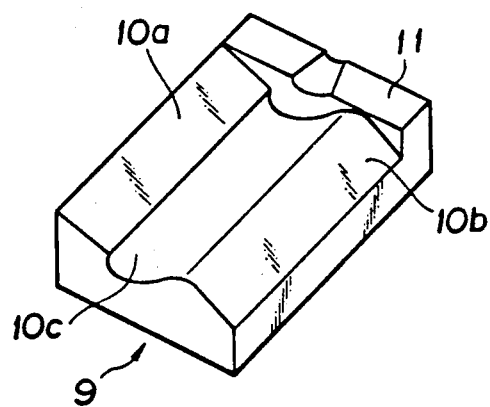
FIG. 6 is a schematic oblique view showing a prior art regulating plate.

The regulating plate to which the present invention is applied is not subject to other specific conditions than the above. For example, one which is shown in FIG. 3 (a) is a regulating plate shown in FIG. 6 to which the present invention is applied. A regulating plate 20 is provided with protruding portions 21 and 22 at the upstream and downstream sides with respect to the magnetic head, and the top portions are formed to flat surfaces 21a and 22a. Inclined surfaces of the protruding portions 21 and 22 are to generate a positive pressure between the rotating flexible magnetic disk and the protruding portions, and the inclination angles and lengths may be different from each other. For example, as shown in FIG. 3 (b), the inclination angle and length of the inclined surface of an upstream-side protruding portion 23 can be greater in inclination angle and shorter in length than that of a downstream-side protruding portion 24. Furthermore, as shown in FIG. 3 (c), protruding portions 25 and 26 are not provided parallelly, but can be provided so that the protruding portions becomes closer to each other along the radial direction to the other periphery, that is, to the right in the figure.

As described above in detail with reference to the embodiments, since, with the present invention, protruding portions provided on the regulating plate are previously formed to abraded, flat surfaces, a good contact with the flexible magnetic disk is obtained from the initial stage, with improved reproducibility. Moreover, since the flat surfaces are less liable to be further abraded, deterioration of characteristics due to adherence of scraped powder is prevented. When the flat surfaces are formed parallel to the flexible magnetic disk, it is advantageous in that the distance between the flat surfaces and the flexible magnetic disk can be measured easily.

Next, an embodiment of the thin film magnetic head according to the present invention will now be described with reference to the drawings and its fabrication process.

Figure 7:
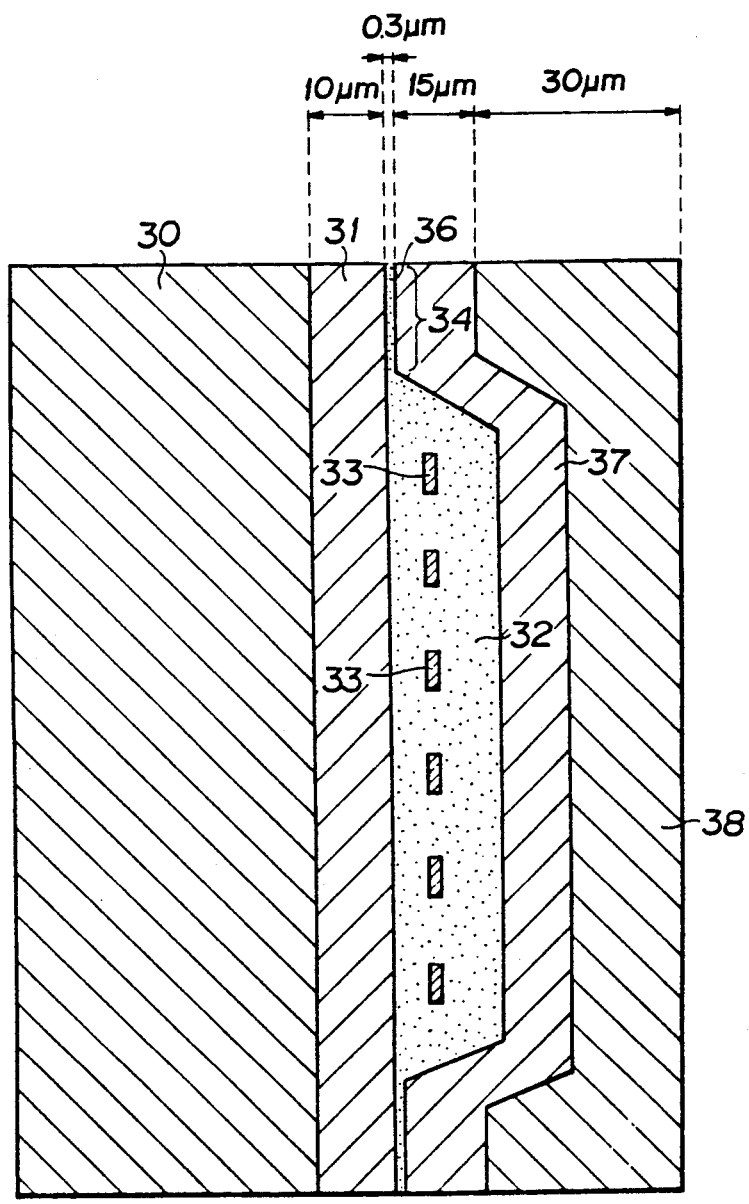
FIG. 7 is a schematic sectional view showing structure of the thin film magnetic head according to the present invention.

FIG. 7 is a schematic sectional view showing the embodiment of the thin film magnetic head. Referring to FIG. 7, a ferromagnetic material based on a Co-Nb-Zr alloy is sputtered to a thickness of 10 $\mu$m on a ferrite substrate 30 to form a lower magnetic layer 31. Then, a non-magnetic insulative layer 32 which, for example, comprises $SiO_2$ and a coil conductor layer 33 which, for example, comprises Cu or Al are formed on the lower magnetic layer 31. The result is then ion-milled into nearly trapezoidal shape to form a gap layer 36 which has a thickness of 0.3 $\mu$m at the front and rear portions 34 and 35. A metallic magnetic material based on a Co-Nb-Zr alloy is sputtered to a thickness of 15 $\mu$m on the non-magnetic insulative layer 32 to form an upper magnetic layer 37, so that the upper magnetic layer 37 is magnetically coupled with the lower magnetic layer 31 at the front portion 34 and the rear portion 35.

Then, a protective layer 38, which is an essential component of the present invention, is formed on top of the upper magnetic layer 37.

When the protective layer was formed from a composition of $MgO$-$SiO_2$, the desired hardness which was same as or lower than that of the magnetic layer is obtained. However, the above composition was found to be insufficient in view of water resistance.

The inventor of the present invention formed protective layers using varied compositions, which were based on the above composition with $Al_2O_3$ added, and obtained the results as shown in Table 1.

These protective layers were formed to thicknesses of 30 $\mu$m by sputtering (cathode power: 1 kW, Ar gas pressure: 0.4 Pa, substrate temperature: water-cooled), of which composition was varied by disposing $SiO_2$, $MgO$ or $Al_2O_3$ on a target comprising $MgO$ and $SiO_2$. The resulting protective layers were compositionally analyzed using XRS (fluorescent X-ray).

TABLE 1

| Sample No. | Protective layer composition (mole %) | | | Hardness Hv (kg/mm$^2$) | Water resistance | Stress evaluation |
| --- | --- | --- | --- | --- | --- | --- |
| | MgO | SiO$_2$ | Al$_2$O$_3$ | | | |
| 1 | 95 | 5 | 0 | 600 | poor | good |
| 2 | 50 | 50 | 0 | 400 | good | good |
| 3 | 25 | 75 | 0 | 600 | good | poor |
| 4 | 40 | 40 | 20 | 650 | good | good |

Based on the above results, further detailed experiments were conducted and the following findings were obtained.

An MgO content of below 15 mole % results in increased stress, whereas that of over 70 mole % results in decreased water resistance. An $SiO_2$ content of below 25 mole % results in a too high hardness, whereas that of over 80 mole % results in increased stress. An $Al_2O_3$ content of below 5 mole % results in too low hardness, whereas that of over 60 mole % results in too high hardness. Furthermore, a two-component system comprising $SiO_2$ and $Al_2O_3$ is inferior in cutting properties, which tends to cause cracking and peeling during the machining of the head sliding surface. When 15 mole % of MgO is added, the machinability is improved, eliminating the above problems.

Figure 8:
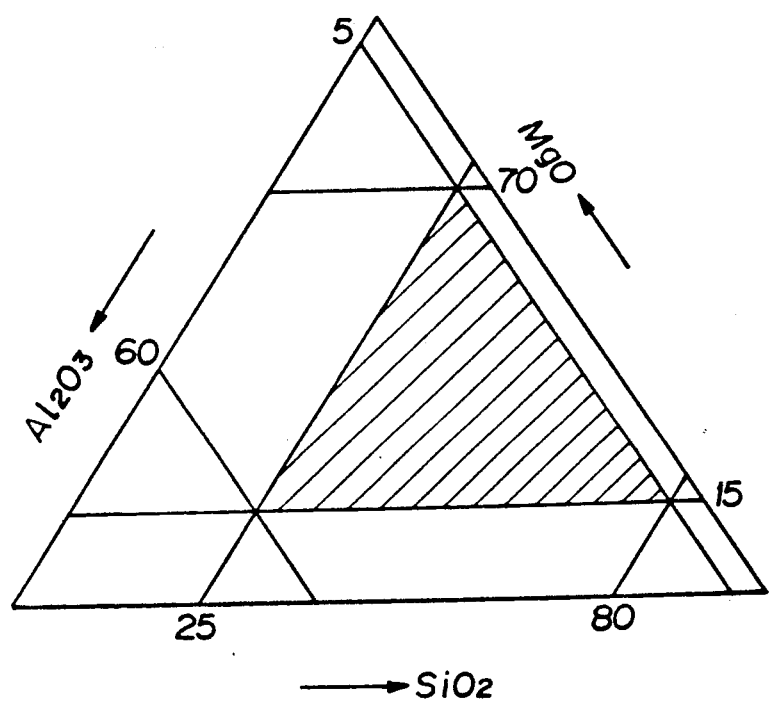
FIG. 8 is a three-component compositional diagram showing compositional ratio of a protective layer used in the present invention.

FIG. 8 is a compositional diagram showing the above three-component system.

Thus, the protective layer used in the thin film magnetic head according to the present invention comprises a composition of $MgO$-$SiO_2$-$Al_2O_3$, preferably comprising 15 to 70 mole % of MgO, 25 to 80 mole % of $SiO_2$, and 5 to 60 mole % of $Al_2O_3$, which provides satisfactory results.

As described above, the present invention can provide a protective layer with a thermal expansion coefficient close to the metallic magnetic material, reduced internal stress, enhanced resistance to biased abrasion, and improved water resistance, thereby enabling a thin film magnetic head with improved recording medium sliding characteristics. While Japanese Patent Publication Laid-open No. 62-16218/1987 discloses that a third substance other than MgO and $SiO_2$ may be added, the present invention is based on the findings that a composition comprising $MgO$-$SiO_2$-$Al_2O_3$ has advantageous properties as a protective layer for a thin film magnetic head and, needless to say, cannot be bound by the Japanese Patent Publication No. 62-16218/1987.

Furthermore, the effects, of the present invention cannot be deteriorated by the addition of a minute amount of a fourth substance to the composition comprising $MgO-SiO_2-Al_2O_3$.

Although the present invention has been described on the basis of the thin film magnetic head as shown in FIG. 7, it is not restricted to the above configuration but can also be applied, for example, to a thin film magnetic head which has a protective plate on the protective layer.

We claim:

1. A thin film magnetic head comprising at least a magnetic layer, a coil conductor layer, and an insulative layer formed on a substrate, and a protective layer stacked on said magnetic layer, characterized in that said protective layer comprises $MgO$, $SiO_2$, and $Al_2O_3$; and further wherein said protective layer comprises 15 to 70 mole % of $MgO$, 25 to 80 mole % of $SiO_2$, and 5 to 60 mole % $Al_2O_3$.

* * * * *